United States Patent Office 3,595,627
Patented July 27, 1971

3,595,627
CONTINUOUS CONDENSATION
POLYMERIZATION FINISHER
James H. Abbott, Ballwin, Mo., Nick K. Harakas, Raleigh, N.C., and George A. Latinen, Springfield, Mass., assignors to Monsanto Company, St. Louis, Mo.
Filed Feb. 12, 1969, Ser. No. 798,627
Int. Cl. B01j 1/00, 7/08; C08g 35/00
U.S. Cl. 23—285    8 Claims

ABSTRACT OF THE DISCLOSURE

A continuous polymerization finisher for removal within a brief holding time of reaction by-products such as water and low boiling organic substances eliminated during linear condensation of polyesters and polyamides. The continuous polymerization finisher comprises a substantially horizontal barrel with closed ends, means for heating said barrel, a supply inlet connected to one end of said barrel, an outlet connected to the opposite end of said barrel, at least one vacuum standpipe proximate the inlet, said standpipe being positioned tangentially to said barrel and disposed within a heating zone, a rotatable member mounted within said barrel proximate the outlet and located within said heating zone, an agitating shaft connected to said rotatable member, said shaft being provided with a plurality of notched flights helixed at a predetermined angle, said shaft extending the length of said barrel, the notched flights having a rotatable sweep commensurate with the diameter of said barrel, a multiplicity of baffles secured to the notched flights, said baffles being spaced equal distances along the length of each of the flights, each of said baffles being attached along its length to said flights and having an arcuate trailing edge conforming to the radius of curvature of said barrel, and driving means for imparting rotation to said shaft.

BACKGROUND OF THE INVENTION

(1) Field of the invention

This invention relates to an apparatus to produce polymeric materials of exceptionally high quality, free from gel particles and suited for continuous removal of volatile constituents eliminated during linear condensation reactions. In particular, this invention relates to a finisher for increasing the average molecular weight during condensation reactions of polyamides and polyesters within a short holding time.

(2) Description of the prior art

During condensation polymerization of polyamides and polyesters, by-products such as water or ethylene glycol are produced during the reaction and must be removed in order to promote further polymerization. Manifestly, it is very desirable to remove such by-products within a very short time after their formation since a broader distribution of higher molecular weight species is ultimately encouraged thereby. Additionally, deleterious effects from the presence of such volatile material entrapped during fabrication will be minimized.

A number of methods and apparatus have been developed to better separate the more volatile components from the polymeric mixture with different degrees of success.

Heretofore, regular continuous polymerization finishers produce condensation polymers with relative viscosities of 40 to 50 from nylon salts within an average holding time of 40 to 80 minutes. A typical apparatus of this type is described in U.S. 3,118,739.

SUMMARY OF THE INVENTION

It is known that most organic polymers are not useful as structural materials when too much low molecular weight species in the form of prepolymers or eliminated by-products thereof are entrapped during their processing, and it is only upon reaching molecular ranges from 10,000 to 50,000 or above that organic polymers become fiber-forming.

In spite of advances made in the processing art, there has been a growing need to achieve high molecular weight polymers within shorter polymerization times.

It is the principal object of this invention to provide an apparatus for finishing polymers produced by condensation reactions within a maximum of 15 minutes holding time to form high molecular weight polymers having a relative viscosity of 100 or more.

It is a further object of this invention to provide an apparatus for increasing the average molecular weight of linear condensation polymers such as polyamides and polyesters by removal of volatile reaction products from the polymer mixture as soon as such volatile materials are formed during condensation.

Other objects will be apparent from the description given hereinafter.

The term "condensation reaction" embraces those reactions of carboxylic acid derivatives, linear polyester, linear polyamides, polyanhydrides and reactions of aldehydes.

The term "relative viscosity" is herein used to signify the ratio of flow time of a specified solution of polymer to the flow time of pure solvent. Thus R. V.$=t/t_o$, where R. V. equals relative viscosity; $t$ equals efflux time of solution and $t_o$ equals efflux time of pure solvent.

The term "specific viscosity" (S. V.) as used herein represents the increase in viscosity of the polymeric solute and is determined by measuring the efflux time of the solution, $t_s$, and the efflux time of the solvent $t_1$ and can be determined by the expression:

$$S.V. = \frac{t_s - t_1}{t_1}$$

The term "prepolymer" will be employed herein to designate low molecular weight species produced by condensation reactions. Such prepolymers have a relative viscosity (R. V.) of 20 or less.

In accordance with this invention, the finisher for continuous polymerization comprises, in combination, a finisher barrel having a substantially horizontal axis and closed ends; means for heating said barrel, said means being spaced along the length of said barrel to define at least three adjacent heating zones; a supply inlet connected to one end of the barrel; an outlet connected to the opposite end and to the underside of said barrel; at least one vacuum standpipe proximate the inlet, said standpipe being positioned tangentially to the barrel and disposed within the initial heating zone; a short screw member rotatably mounted within the barrel, proximate the outlet and located within the last heating zone; an agitating shaft connected to the short screw member and rotatable therewith, said shaft being provided perimetrically with a plurality of notched flights helixed at a predetermined angle, said shaft extending the length of the barrel proximate the inlet and outlet thereof, the notched flights having a rotational sweep commensurate with the diameter of said barrel; a multiplicity of baffles secured to the notched flights, said baffles being spaced equidistant along the length of each of the flights, each of said baffles being attached along its length to said flights and having an arcuate trailing edge conforming to the radius of curvature of said barrel; and driving means for imparting rotation to said shaft.

DESCRIPTION OF THE PREFERRED EMBODIMENTS

Figure 1:
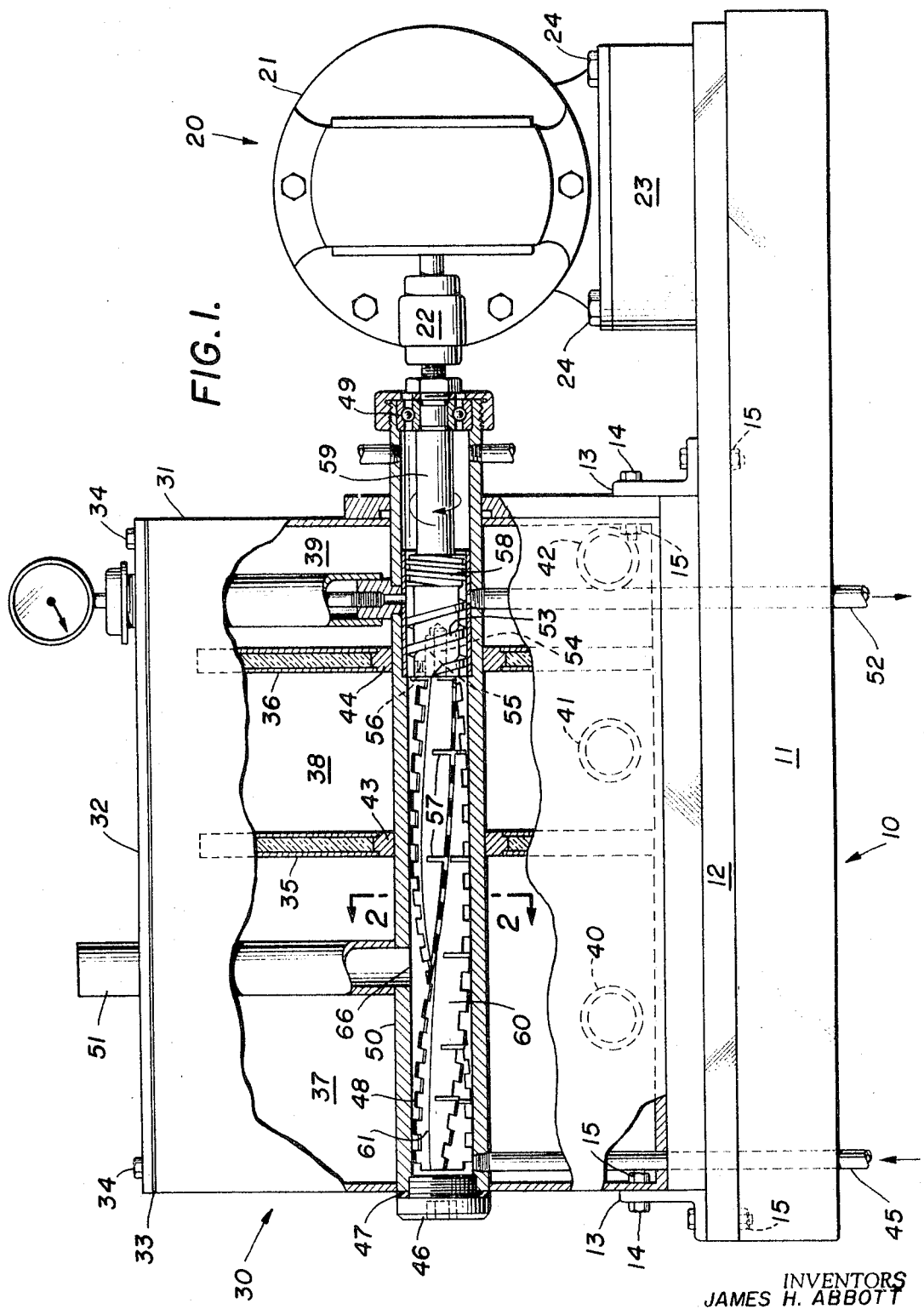
FIG. 1 depicts the continuous polymerization finisher of the present invention, a portion of it being cut away to expose the internal structural features.

Referring particularly to FIG. 1, an embodiment of an apparatus within the scope of the invention comprises three general features, a base structure 10, a driving means 20 and the finisher complex 30, the latter being the invention herein described in detail. A rectangular reservoir 31 is mounted on a plate 12 by angle plates 13 and mounting bolts 14. The reservoir 31 has a closure 32 which is provided with a sealing gasket 33 and mounting screws 34. Dividing the reservoir 31 are two insulating baffles 35 and 36 defining three compartments 37, 38 and 39. At the base and centered within the aforementioned compartments are heating elements 40, 41, and 42. Positioned lengthwise within the reservoir 31 is a hollow finisher barrel 50 which extends through adaptor rings 43 and 44 secured to the baffles 35 and 36.

Figure 2:
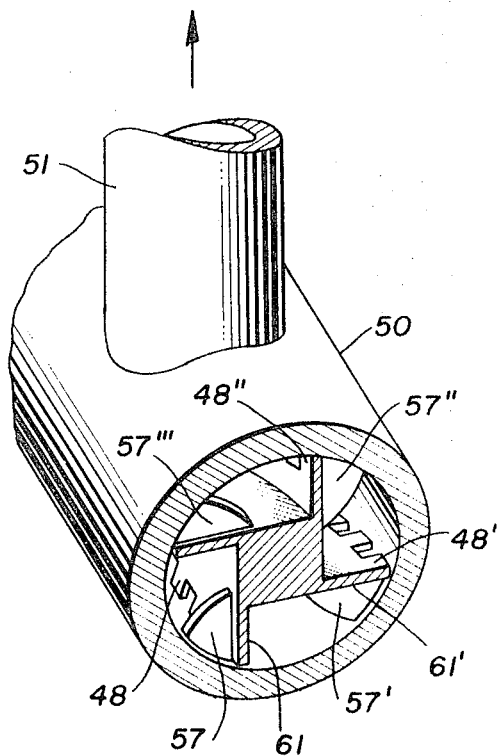
FIG. 2 depicts a sectional view along line 2—2 through the finisher of FIG. 1.

The finisher barrel 50 has an inlet pipe 45 connected to one end thereof, the inlet pipe passing through the compartment 37 to gain entrance to the underside portion of the barrel. The finisher barrel 50 is capped at its inlet end by a threaded cap 46 and cap gasket 47. Situated also within the compartment 37 is a vacuum vapor standpipe 51 which is tangentially affixed to the finisher barrel 50. This is better shown in FIG. 2. Located at the opposite end of the finisher barrel 50 is an outlet pipe 52 connected to said barrel also at its underside portion and enclosed along part of its length within compartment 39. Within the barrel 50 and proximate the outlet pipe 52 is an extrusion screw 53 which has a single helix designed to turn toward the terminal end of the barrel and present a minimal clearance between the internal surface thereof. Attached to the screw 53 is a counter screw 58 which in turn is connected to an outer shaft 59 and aligned with a flexible coupling 22 driven by a variable speed motor 21. The variable speed drive motor 21 is secured to the plate 12 and base 11 by a spacer 23 and mounting screws 24.

Contained within the finisher barrel 50 is an agitating shaft 60 which is attached to the extrusion screw 53 by a stud shaft 54 by key 55 and secured set screw 56.

The agitating shaft 60 consists of four notched flights, 61, 61', 61" and 61'" extending along the length of the barrel 50. It is noted that the agitating shaft 60 is helixed at some fixed angle and has a series of baffle plates 57 spaced equidistant along the length of the notched flights, 61, 61', 61" and 61'".

It can be appreciated that the helix angle, the number of baffle plates and the notch depth are dependent upon the polymer viscosity. The helix angle refers to the angle between the helix and a plane passing perpendicular to the shaft. Preferably, the helix angle should be from about 90° to 25°; the most desirable range being about 87° to 68°. The number of turns or complete revolutions per foot is less than ⅔. Manifestly, baffles 57, 57' and 57", etc. enhance polymerization through increased agitation and also prevent back mixing. It is also observed that the aforementioned baffles have the same height as the teeth 48, 48', 48" and 48'", etc., and affixed thereto and possess an arcuate tail which partially conforms to the radius of curvature of barrel 50. As for the depth of the notches spaced on flights 61, 61', etc., this may vary from ⅟₁₆ to 1½ inches with the most desirable range being from ⅛ to ½ inch. Preferably there are at least six baffles per flight and from 1 to 8 flights per shaft length.

The operation of the apparatus will now be readily apparent.

In the embodiment shown, reactive prepolymeric material to be increased in molecular weight is forced through the supply inlet pipe 45 by a pump (not shown) and allowed to pass into the finisher barrel 50, the externally located heating means 40, 41 and 42 serving to increase the temperature of the material being introduced. The prepolymer material is allowed to fill approximately ½ to ⅔ of the barrel 50, leaving free space in the upper portion of the barrel. It can be appreciated that within said barrel there is continuous mixing due to the agitating shaft 60 and a corresponding sweeping action over the barrel wall by the rotating notched flights 61, 61', 61" . . . etc., which enhances the diffusion rate by exposing a multiplicity of thin films. Thus, the notched flights create in the free space an array of arced films transversely with respect to the axis of the barrel whereby rapid diffusion of reactants and removal of by products are readily accomplished.

While being continuously agitated, the polymeric material is transported axially of the shaft toward the extrusion screw 53, due to the helical configuration of the notched flights. During this mixing action and within the confines of the barrel, the vacuum standpipe 51 removes volatile by-products. It is to be noted that vacuum standpipe 51 is tangentially affixed to the finisher barrel to prevent any clogging or stagnant space where gel formation may occur, since the notched flights sweep continuously port 66 clean.

The invention is further illustrated by the following examples in which all parts and percents are by weight unless otherwise indicated. These examples are intended to be illustrated only and not as limitations on the scope of the invention.

EXAMPLE I

A 50% by weight aqueous solution of hexamethylenediamine adipic acid salt of pH 7.4 was passed through a thin-film vertical tube evaporator operating described in U.S. Pat. 3,296,217 at a pressure of 150 p.s.i.g. at an average temperature of about 205° C. at the inlet and 260° C. at the outlet, the evaporator being equipped with a stripping column above the top zone for separation of hexamethylene diamine. The flow rate of the salt to the evaporator was about 3 pounds per hour, the reflux ratio of the stripping column being 3.1:1. The residence time in the evaporator was about 45 minutes; the prepolymer flow rate to the subject finisher having a helix angle of 83°14' (⅓ turn/foot) was about 1.5 pounds per hour. The helix speed was 60 r.p.m. The temperature of the finisher barrel was 278° C. to 280° C. and the pressure was maintained at 760 to 550 mm. Hg, absolute pressure. The full residence time in the finisher was 7 minutes. Data for prepolymer and finisher polymer are given in Table I, Line I.

EXAMPLE II

A prepolymer was continuously prepared from 47% by weight of hexamethylenediamine adipic acid salt of pH 7.4 in a thin film evaporator as described in Example I operating at 152 p.s.i.g. with an average temperature of about 203° C. at the inlet and 265° C. at the outlet. The evaporator had a feed rate of 5.05 pounds per hour and a reflux ratio of 4.3:1. The residence time in the evaporator was 80 minutes. The prepolymer flow rate to the finisher was about 1 pound per hour. The finisher helix angle was 83°14' (⅓ turn/ft.) and the helix speed was 59 r.p.m. The temperature of the finisher barrel was 280° C., the extrusion temperature being 280° C. The pressure was 8 to 10 mm. Hg, absolute pressure. The full residence time in the finisher was 7 minutes. Data for prepolymer and finished polymer are given in Table I, Line II.

EXAMPLE III

A 51% by weight hexamethylenediamine adipic acid salt of pH 7.4 was passed through a thin-film evaporator of Example I operating at 150 p.s.i.g. wtih an average temperature of about 203° C., at the inlet and a temperature of 265° C., at the outlet. The feed rate to the evaporator was 1.6 pounds per hour and the reflux ratio of the stripping column was 5.7:1. The residence time in the evaporator was 63 minutes. The prepolymer flow rate to the finisher was about 1.6 pounds per hour. The helix angle was 83°14′ (⅓ turn/ft.). The helix speed was 58 r.p.m. and the temperature of the finisher barrel temperature was 280° C.; extrusion temperature of the finisher was 280° C. The pressure was maintained at 0.1 to 0.3 mm. Hg, absolute pressure. The full residence time in the finisher was 11 minutes. Data for the prepolymer and the finished polymer are given in Table I, Line III.

EXAMPLE IV

A prepolymer was continuously prepared from a 47.5% by weight of hexamethylenediamine adipic acid salt of pH 7.4 by passing through a thin film evaporator of Example I operating at 150 p.s.i.g. with an average inlet temperature of 201° C., and an average outlet temperature of 267° C. The feed rate for the salt to the evaporator was about 1.6 pounds per hour and the reflux ratio was 5.9:1. The residence time in the evaporator was about 65 minutes. The prepolymer flow rate to the finisher was about 0.7 pound per hour. The finisher helix angle was 83°14′ (⅓ turn/ft.) and the helix speed was 49 r.p.m. The temperature of finisher was 280° C. and the extrusion temperature was 280° C. The pressure of the finisher was maintained at 0.1 to 0.3 mm. Hg, absolute pressure. The full residence time in the finisher was 15 minutes.

EXAMPLE V

A 47.8% by weight aqueous solution of hexamethylenediamine adipic acid salt of pH 7.4 was passed through a thin film evaporator of Example I operating at a pressure of 150 p.s.i.g. with an average inlet temperature of 200° C. and an average outlet temperature of 270° C.; the evaporator being equipped with a stripping column above the top zone for separation of hexamethylenediamine. The flow rate of the salt to the evaporator was about 1.6 pounds per hour, the reflux ratio of the stripping column being 6:1. The residence time was 10 minutes in the finisher. The prepolymer flow rate was about 0.7 pound per hour. The finisher helix angle of the finisher was 75°18′, ⅔ turn per foot. The helix speed was 49 r.p.m. and the temperature was 280° C.; the extrusion temperature being the same. The pressure was 0.5 to 0.3 mm. Hg, absolute pressure. The full residence time in the finisher was 10 minutes. Data for the prepolymer and finished polymer are given in Table I, Line V.

EXAMPLE VI

A solution of poly(ethylene terephthalate) with an average specific viscosity of 0.34 containing 400 p.p.m. 2,2′ - ethylenedioxybis(1,3,2 - dioxastibolane) as catalyst was fed into the subject finisher at a rate of 3 pounds per hour. The helix angle was 83°14′ (⅓ turn per foot); the helix speed in the barrel was 48 r.p.m. The temperature of the inlet of the finisher barrel was 200° C., while the exit temperature was 290° C. The pressure was maintained at 0.1 mm. Hg, absolute pressure. The full residence time in the finisher was 10 minutes. Data for the properties are given in Table II, Line VI.

EXAMPLE VII

A solution of poly(ethylene terephthalate) with an average specific viscosity of 0.40 containing 400 p.p.m. of 2,2′ - ethylenedioxybis(1,3,2 - dioxastibolane) catalyst was fed into the subject finisher at a rate of 3 pounds per hour. The finisher helix was the same as in Example VI, the helix speed being 60 r.p.m. The temperature of the finisher barrel at the inlet was 280° C., while the exit temperature was 290° C. The pressure was maintained at 0.1 mm. Hg, absolute pressure. The full residence time in the finisher was 8 minutes. Data for the properties are given in Table II, Line VII.

EXAMPLE VIII

A solution of poly(ethylene terephthalate) with an average specific viscosity of 0.38 containing 400 p.p.m. of 2,2′ - ethylenedioxybis(1,3,2 - dioxastibolane) catalyst was fed in the subject finisher at a rate of 3 pounds per hour. The helix angle was as in Example VI, the helix speed being 80 r.p.m. The temperature of the inlet being 285° C., and a temperature at the exit of 275° C. The pressure was maintained at 0.1 mm. Hg, absolute pressure. The full residence time in the finisher was 5 minutes. Data for the properties are given in Table II, Line VIII.

EXAMPLE IX

A solution of poly(ethylene terephthalate) with an average specific viscosity of 0.35 containing 200 p.p.m. of 2,2′ - ethylenedioxybis(1,3,2 - dioxastibolane) catalyst was fed to the finisher at a rate of 3 pounds per hour. The helix angle was 83°14′ (⅓ turn/ft.); the helix speed being 80 r.p.m. The temperature of the inlet being 285° C., and a temperature at the exit of 265° C. The pressure was maintained at 0.1 mm. Hg, absolute pressure. The full residence time in the finisher was 6 minutes. Data for the properties are given in Table II, Line IX.

TABLE I

| Example | Prepolymer | | | Finished polymer | | |
| --- | --- | --- | --- | --- | --- | --- |
| | R.V. | End group | | R.V. | End group count [1] | |
| | | —COOH | —NH$_2$ | | —COOH | —NH$_2$ |
| I | 12.7 | 180 | 155 | 27.9 | 105 | 65 |
| II | 14.3 | 156 | 143 | 56.7 | 69 | 54 |
| III | 14.1 | 173 | 130 | 81.6 | 57 | 42 |
| IV | 13.7 | 152 | 160 | 134.0 | 51.2 | 39 |
| V | 13.5 | 175 | 141 | 72.0 | 50.6 | 60 |

[1] Equivalent/10$^6$ grams.

TABLE II

| Example | Prepolymer, S.V. | Finished polymer | | |
| --- | --- | --- | --- | --- |
| | | S.V. | —COOH [1] | Mole percent glycol conc. |
| VI | 0.34 | 0.50 | 29.0 | 3.2 |
| VII | 0.40 | 0.52 | 33.0 | 3.4 |
| VIII | 0.38 | 0.49 | 32.0 | 3.3 |
| IX | 0.35 | 0.46 | 23.5 | |

[1] Equivalent/10$^6$ grams.

The relative viscosity (R.V.) is measured in a solution of 8.3 wt. percent of polymer in 9.0 wt. percent of formic acid and compared with ninety percent formic acid at 25° C.

The specific viscosity (S.V.) is determined by measuring the efflux time of a 0.5% solution in a phenol-trichlorophenol solvent mixture as 25° C. using a modified Ostwald-Cannon-Fenske viscometer. The efflux time of the solvent is measured similarly, and the specific viscosity then calculated.

The end group count is indicative of the degree of polymerization; the lower the end group count number the better the finished qualities of the polymer. Thus, the higher the R.V. the lower the end group count.

The effectiveness of the subject finisher is shown in producing a polymer having a high R.V. within 7 to 15 minutes by increasing the degree of vacuum and lowering the polymer rate to the finisher. It is to be noted that the R.V. of the finished product is reduced when employing a helix angle of 75°18′ and having ⅔ turn per foot.

Polyester denotes any long-chain synthetic polymer composed of at least 85% by weight of an ester of a dihydric alcohol and terephthalic acid, and includes polyalkylenes terephthalates being polyethylene terephthalate, polypropylene terephthalate, cyclohexane dimethylene terephthalate.

Nylon denotes any long-chain synthetic polyamide having recurring amide groups as an integral part of the polymer chain, and includes nylon 6, nylon 66, etc.

Although the examples given are drawn from nylon and polyester, various other polymerized materials condensation reactions may be adequately treated as phenol-formaldehyde, melamine-formaldehyde, polycarbonate, and ureaformaldehyde, etc.

It will thus be seen that the objects set forth above among those made apparent herein are attained and since certain changes may be made in carrying out the above apparatus, it is intended that all material contained in this description shall be interpreted as illustrative and not in a limiting capacity.

We claim:
1. A continuous polymerization finisher which comprises, in combination:
   (a) a finisher barrel having a substantially horizontal axis and with closed ends;
   (b) means for heating said barrel, said means being spaced along the length of said barrel to define at least two adjacent heating zones;
   (c) a supply inlet connected to one end of the barrel;
   (d) an outlet connected to the opposite end of said barrel on the lower side thereof;
   (e) at least one vacuum standpipe proximate the inlet, said standpipe being positioned tangentially to the barrel and disposed within the initial heating zone;
   (f) a short screw member rotatably mounted within the barrel proximate the outlet and located within the last heating zone;
   (g) an agitating shaft connected to the short screw member and rotatable therewith, said shaft being provided perimetrically with a plurality of notched flights helixed at a predetermined angle, said shaft extending the length of the barrel, the notched flights having a rotational sweep commersurate with the diameter of the barrel;
   (h) a multiplicity of baffles secured to the notched flights, said baffles being spaced equidistant along the length of each of the flights, each of said baffles being attached along its length to said flights and having an arcuate trailing edge conforming to the radius of curvature of the barrel; and
   (i) driving means for imparting rotation to said shaft.

2. A finisher as recited in claim 1 wherein the agitating shaft has an helix angle of about 90° to 25°.

3. A finisher as recited in claim 1 wherein the depth of the flight notches in the range of from ⅛ to 1½ inch.

4. A finisher as recited in claim 1 wherein the agitating shaft has an helix angle of 87° to 68°.

5. A finisher in accordance with claim 4 wherein the number of turns per foot of said notched flights is less than ⅔.

6. A finisher as recited in claim 1 wherein there are at least six baffles per flight.

7. A finisher as recited in claim 6 wherein there are at least 40 notches and 45 teeth.

8. A finisher as recited in claim 6 wherein there are from 2 to 8 flights.

References Cited
UNITED STATES PATENTS

| | | | |
|---|---|---|---|
| 2,064,131 | 12/1936 | Tuscan et al. | 259—10 |
| 2,587,127 | 2/1952 | Erickson et al. | 259—10 |
| 2,698,742 | 1/1955 | McCoy | 259—9X |
| 2,944,292 | 7/1960 | Norrhede | 259—9X |
| 3,046,099 | 7/1962 | Willey | 23—285 |
| 3,057,702 | 10/1962 | Pierce et al. | 23—285 |
| 3,211,209 | 10/1965 | Latinen et al. | (159—ZEUX) |
| 3,248,180 | 4/1966 | Kilpatrick | 23—285 |
| 3,279,895 | 10/1966 | Howe | 23—285 |
| 3,440,019 | 4/1969 | Albrecht et al. | 23—285 |
| 3,484,213 | 12/1969 | Dew et al. | 23—285 |

MORRIS O. WOLK, Primary Examiner

B. S. RICHMAN, Assistant Examiner

U.S. Cl. X.R.

23—252R; 55—36, 191, 192, 195, 208, 267; 159—2E; 259—9, 10